United States Patent [19]
Wörner

[11] 4,000,794
[45] Jan. 4, 1977

[54] CONTROL MEMBER FOR A CLUTCH DISK OF A MOTOR VEHICLE MAIN CLUTCH

[75] Inventor: Günter Wörner, Rommelshausen, Germany

[73] Assignee: Daimler-Benz Aktiengesellschaft, Germany

[22] Filed: Oct. 16, 1974

[21] Appl. No.: 515,340

[30] Foreign Application Priority Data
Oct. 17, 1973  Germany ............. 7337305[U]

[52] U.S. Cl. .................. 192/106.2; 64/27 C
[51] Int. Cl.[2] ............ F16D 69/00; F16D 3/14
[58] Field of Search ......... 192/106.1, 106.2, 30 V, 192/70.17; 64/27 C

[56] References Cited
UNITED STATES PATENTS

| | | | |
|---|---|---|---|
| 2,291,405 | 7/1942 | Nutt .................. | 192/106.2 |
| 2,571,291 | 10/1951 | Reed ................. | 192/106.2 X |
| 2,613,515 | 10/1952 | Crutchley ........... | 192/106.2 X |
| 2,636,363 | 4/1953 | Nutt .................. | 192/106.2 X |
| 3,578,121 | 5/1971 | Maurice ............. | 192/106.2 |
| 3,762,521 | 10/1973 | Dotter ............... | 192/106.2 |
| 3,863,747 | 2/1975 | Werner et al. ...... | 192/106.2 |

*Primary Examiner*—Samuel Scott
*Assistant Examiner*—Lance W. Chandler
*Attorney, Agent, or Firm*—Craig & Antonelli

[57] ABSTRACT

A control member for a clutch disk of motor vehicle main clutches in which a disk member carrying the friction linings and a lateral member rigidly connected therewith are operatively torsionally elastically connected with the flange of a hub member; several springs or spring sets of different characteristics are thereby retained in the windows of one of the two parts torsionally elastically connected with each other and engage in windows of the other part while frictional damping devices are provided, whereby the start of opertion of at least one damping device is determined by a control member which engages with tabs, arms or the like in the windows intended for the accommodation of the springs or cooperates with the spring ends; the control member includes an approximately radially extending fork-like arm whose two fork ends are bent over along their radial edges, as viewed in the axial direction, and therewith enclose a control spring; these bent over portions are supported at their radial inner ends with respect to the annular portion of the control member while two essentially mutually oppositely disposed axial angularly bent portions are provided, offset in the direction of rotation with respect to the fork like arm, for engagement in corresponding windows of the hub flange.

19 Claims, 4 Drawing Figures

CONTROL MEMBER FOR A CLUTCH DISK OF A MOTOR VEHICLE MAIN CLUTCH

The present invention relates to a control member for a clutch disk of a motor vehicle main clutch, in which a disk member carrying the friction linings and a lateral plate-like sheet metal member rigidly connected therewith are operatively torsionally elastically connected with the flange of a hub member whereby several springs or spring sets of different characteristics are retained in windows of one of the two parts torsionally elastically connected with each other and engage in windows of the other part, and whereby damping devices for the damping are provided and the start of operation of at least one damping device is determined by a sheet metal control member which engages with tabs, arms or the like into the windows intended for the accommodation of the springs or cooperates with the spring ends.

Clutches of the aforementioned type have already been proposed in another German patent application filed in the name of the assignee of the instant application (P 23 18 907.3). The present invention is now concerned with the task to improve the sheet metal control members of such clutches and more particularly by an improved space distribution. Additionally, the abutment at the spring ends is to be improved and the centering of the sheet metal control member is to be relieved or unstressed.

The underlying problems are solved according to the present invention in the arrangements of the aforementioned type in that the sheet metal control member includes an approximately radially extending fork-like arm, whose two fork ends are bent over along their radial edges as viewed in the axial direction, and therewith enclose a control spring, that these bent over tabs or lugs are supported at their radially inwardly disposed ends with respect to the annular portion of the control member and that offset in the direction of rotation with respect thereto, two mutually essentially oppositely disposed axial, annularly bent portions are provided for the engagement in corresponding windows of the hub flange.

This construction according to the present invention offers the advantage that the function during the return or backward movement and during the forward movement of the control member is separate. Furthermore, during the forward movement a force pair results so that the centering of the sheet metal control member is not loaded or stressed. The spring ends abut very well at the inwardly bent tabs or lugs of the control member and the support produces a favorable force transmission.

It is additionally proposed by the present invention that the corresponding windows are recessed radially inwardly, and serve in this recessed area for the engagement of the axial angularly bent portions arranged at the sheet metal control member. In this manner the control tabs are displaced into smaller diameter areas and one gains more space along the larger diameter for the accommodation of the other control windows.

In one embodiment according to the present invention, the two bent-over tabs are connected with each other and with the annular portion of the sheet metal control member at their inner ends by an approximately equally deep cross bridge. A pocket, closed in itself, results in this manner which is very rigid. If this should not be possible for space reasons or other reasons or should it not be desirable, then according to another feature of the present invention, the construction takes place in such a manner that each bent-over tab or lug is operatively connected at its inner end with the annular portion of the sheet metal control member by an inclined surface disposed approximately in the circumferential direction.

Finally, it is additionally proposed by the present invention that approximately opposite to the fork arm is provided a radially extending tab for the compensation of the imbalance. Of course, also the two axial angularly bent portions may be included in this compensation.

Accordingly, it is an object of the present ivention to provide a control member for a clutch disk of motor vehicle main clutches which avoids by simple means the aforementioned shortcomings and drawbacks encountered in the prior art.

Another object of the present invention resides in a sheet metal plate-like control member for a clutch disk of motor vehicle main clutches which is not only improved, particularly as regards its space conditions but additonally improves the abutment at the spring ends and relieves the centering of the control member.

A further object of the present invention resides in a control member for a clutch disk of motor vehicle main clutches in which the functions during forward and return movement of the control member are separate from one another.

Still another object of the present invention resides in a control member of the type described above in which the springs abut very well at the control member and produce a favorable force transmission.

Still a further object of the present invention resides in a control member for the clutch disk of motor vehicle main clutches in which one gains additional space along the larger diameter for the accommodation of the control windows.

Another object of the present invention resides in a control member of the type described above which compensates for imbalances and provides a relatively inherently rigid construction.

These and further objects, features and advantages of the present invention will become more apparent from the following description when taken in connection with the accompanying drawing which shows, for purposes of illustration only, one embodiment in accordance with the present invention, and wherein.

Figure 1:
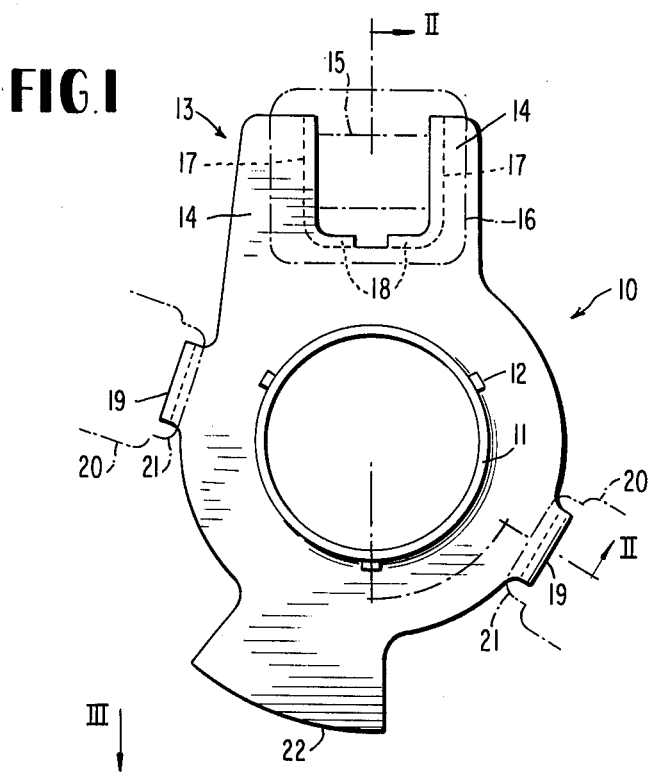
FIG. 1 is an elevational view of the plate-like sheet metal control member in accordance with the present invention, indicating the arrangement of the windows on other parts (now shown) in dash and dot lines.
Figure 2:
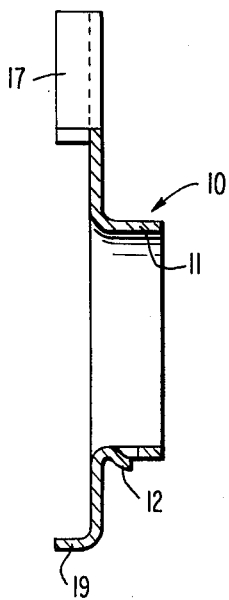
FIG. 2 is a cross sectional view through the control member, taken along line II—II of FIG. 1.
Figure 3:
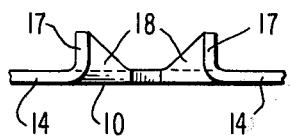
FIG. 3 is an end view, taken in the direction of arrow III of FIG. 2, on the bent-over tabs of the control member in accordance with the present invention
Figure 4:
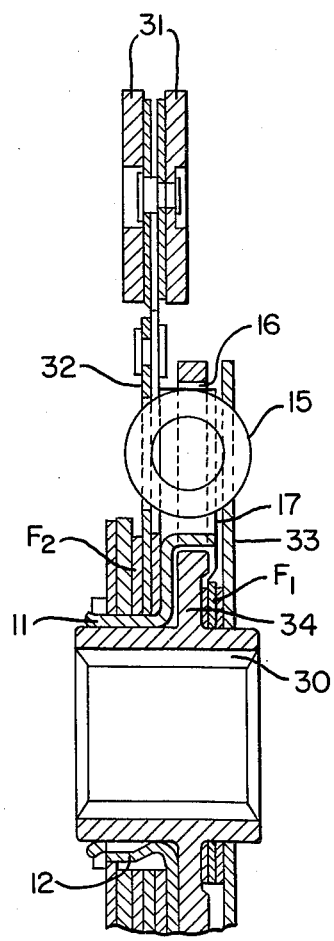
FIG. 4 is a partial longitudinal cross-sectional view through a clutch disk in accordance with the present invention.

Referring now to the drawing wherein like reference numerals are used throughout the various views to designate like parts, the sheet metal control member generally designated by reference numeral 10 which is illustrated in FIGS. 1–4, is constructed in a known manner as an annular disk member and includes a sleeve portion 11 at the inner diameter for the accommodation of the friction devices $F_1$, $F_2$ of conventional construction. Punched out tabs or lugs 12 serve in a known manner for the entrainment of the friction disks. The sheet metal control member 10 includes additionally an arm generally designated by reference numeral 13 which extends radially and terminates in two fork arms 14. By means of these fork arms 14 the sheet metal control member 10 encloses at this place the control spring 15 which is indicated only in dash and dot lines. It is arranged in a window 16 of the flange 34 of a hub 30 of conventional construction. A disk member 32 carrying friction linings 31 and a lateral member 33 are rigidly connected in a conventional manner and torsionally elastically connected with the flange 34 of the hub 30.

In order to achieve a better abutment of the spring 15, the arms 14 are bent over along their radial edges into tabs or lugs 17 which extend approximately in the axial direction. In order that these tabs or lugs 17 have the necessary rigidity, they are supported at the inner ends by two inclined surfaces 18 with respect to the annular disk portion. Hence, they cannot bend through (see in particular FIG. 3).

Two axial angularly bent portions 19 are provided at the sheet metal control member 10 displaced in the direction of rotation with respect to the arm 13 which are disposed mutually essentially opposite one another. These axial angularly bent portions 19 engage in windows 20 of the hub flange. These last-mentiond windows 20 are provided for this purpose with an inwardly directed recess 21 so that the angularly bent portions 19 come to lie along as small a diameter as possible. The edges of the recess 21 then form the abutment for the angularly bent portions 19 during the forward movement.

Approximately opposite the fork arm 13 is a tab or arm 22 as imbalance compensation which extends essentially radially and has a certain extent in the circumferential direction.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A control structure for a clutch disk of motor vehicle main clutches in which a disk means carrying friction linings and a lateral member rigidly connected therewith are operatively connected torsionally elastically with a flange of a hub means, and in which several spring means of different characteristics are retained in window means of one of the two parts torsionally elastically connected with each other and engage in window means provided in the other of said two parts, and in which damping means are provided with the start of operation of at least one damping means being determined by a control means, characterized in that the control means includes an approximately radially extending fork-like arm whose two fork ends are bent over at their radial edges as viewed in the axial direction and therewith enclose a control spring, in that the tab means formed by the bent over portions of the fork ends are supported at the radially inner ends with respect to the control means, and in that offset in the direction of rotation with respect thereto are provided axial, angularly bent portions for engagement in corresponding window means of the hub flange means.

2. A control structure according claim 1, characterized in that the control means is a plate-like sheet metal control member.

3. A control structure according to claim 1, characterized in that several spring sets of different characteristics are retained in window means provided in said one part.

4. A control structure according to claim 1, characterized in that said control means engages into window means intended for the accommodation of spring means.

5. A control structure according to claim 4, characterized in that said control means engages in said window means by means of tabs.

6. A control structure according to claim 4, characterized in that said control means engages in said window means by means of arms.

7. A control structure according to claim 1, characterized in that said control means cooperates with the spring ends.

8. A control structure according to claim 1, characterized in that corresponding window means are recessed radially inwardly and serve within said recessed area for the engagement of the axial, angularly bent portions at the control means.

9. A control structure according to claim 8, characterized in that the two bent-over tab means are connected with each other and with an annular portion of the control means along their inner ends by a cross bridge portion of approximately equal depth.

10. A control structure according to claim 8, characterized in that each bent-over tab is operatively connected at its inner end with an annular portion of the control means by an inclined surface disposed approximately in the circumferential direction.

11. A control structure according to claim 8, characterized in that a radially extending arm means for the compensation of imbalances is provided approximately opposite to the fork arm.

12. A control structure according to claim 11, characterized in that the two bent-over tab means are connected with each other and with an annular portion of the control means along their inner ends by a cross bridge portion of approximately equal depth.

13. A control structure according to claim 11, characterized in that each bent-over tab is operatively connected at its inner end with an annular portion of the control means by an inclined surface disposed approximately in the circumferential direction.

14. A control structure according to claim 1, characterized in that a radially extending arm means for the compensation of imbalances is provided approximately opposite to the fork arm.

15. A control structure according to claim 1, characterized in that the two bent-over tab means are connected with each other and with an annular portion of the control means along their inner ends by a cross bridge portion of approximately equal depth.

16. A control structure according to claim 1, characterized in that each bent-over tab is operatively connected at its inner end with an annular portion of the control means by an inclined surface disposed approximately in the circumferential direction.

17. A control structure according to claim 1, characterized in that at least two axial, angularly bent portions are provided and disposed on said control means substantially mutually opposite one another.

18. A control structure according to claim 17, characterized in that corresponding window means are recessed inwardly and serve within said recessed area for engagement of the respective axial, angularly bent portions.

19. A control structure according to claim 11, characterized in that at least two axial, angularly bent portions are provided and disposed on said control means substantially mutually opposite one another.

* * * * *